Jan. 17, 1950     P. R. YATES     2,494,639
COUPLING
Filed Jan. 11, 1946
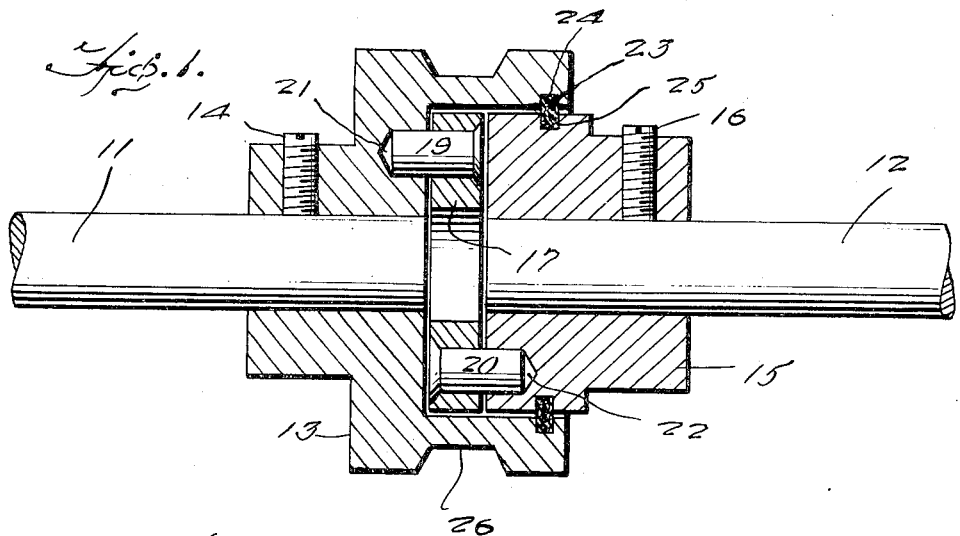
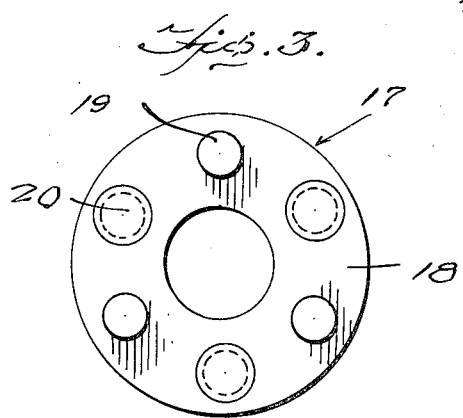
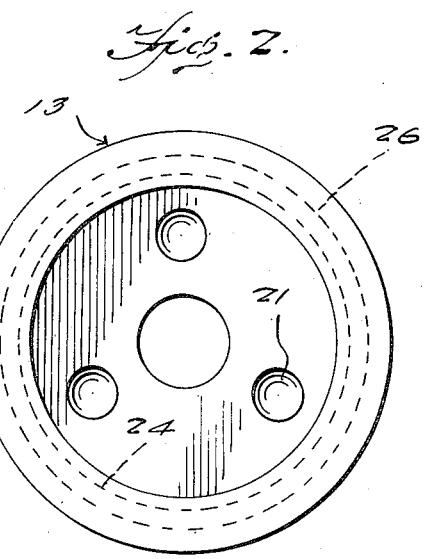
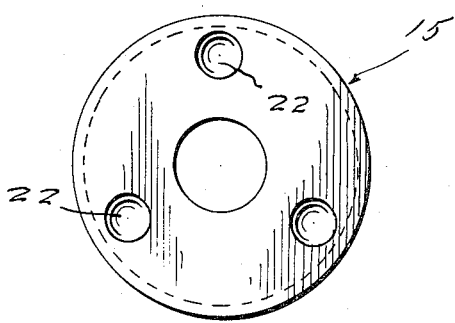
Inventor
Paul R. Yates
Morrow, Berman & Davidson
Attorneys Patented Jan. 17, 1950

2,494,639

UNITED STATES PATENT OFFICE 2,494,639

COUPLING

Paul R. Yates, Salt Lake City, Utah

Application January 11, 1946, Serial No. 640,521

4 Claims. (Cl. 287—130)

This invention relates to improvements in couplings for flexible shafting.

A main object of the invention is to provide a novel and improved connecting structure for connecting sections of flexible shafting, said structure being characterized by simplicity of parts and being very easy to apply.

A further object of the invention is to provide an improved coupling for connecting sections of flexible shafting, which is composed of a few simple parts which are easy to manufacture and which is adapted to transmit torque in a reliable manner when employed to connect the sections of flexible shafting.

Further objects and advantages of the invention will appear from the following description and claims, and from the accompanying drawings, wherein:

Figure 1 is a longitudinal cross sectional view taken through a coupling according to this invention shown in operative position with respect to a pair of flexible shafting sections.

Figure 2 is a front elevational view of the female member of the coupling of Figure 1.

Figure 3 is a plan view of a spider member employed with the coupling of Figure 1.

Figure 4 is an elevational view of the male member of the coupling of Figure 1.

Referring to the drawings, 11 and 12 designate a pair of aligned sections of flexible shafting which are coupled together by a coupling structure comprising a female member 13 rigidly secured by a set screw 14 to shaft section 11, and a male member 15 rigidly secured by a set screw 16 to shaft section 12 and received within female member 13, and a spider member 17 interposed between female member 13 and male member 15 and transmitting torque therebetween. Spider member 17 comprises an annular disc 18 having projecting from one face thereof three lug members 19 spaced apart by 120° and having projecting from the opposite face thereof three lug members 20 similarly spaced apart by 120° but staggered with respect to lug members 19 so that there is a 60° spacing between each lug member 19 and the adjacent lug members 20. The inner face of female member 13 is formed with three recesses 21, each adapted to receive a lug member 19 and the face of male member 15 is likewise formed with three recesses 22 each adapted to receive a lug member 20. The recesses 21 and the recesses 22 are spaced 120° apart corresponding to the angular spacing of the respective lug members 19 and 20. The space between female member 13 and male member 15 is packed with grease to eliminate noise due to looseness of parts and to reduce wear of said parts. A packing ring 23 is provided between female member 13 and male member 15 to retain the grease, the female member being formed with an annular groove 24 and the male member being formed with a peripheral groove 25 registering with groove 24 to receive a packing ring 23.

Shaft sections 11 and 12 are supported in appropriate bearings, not shown, so that relatively little axial tension is developed between the shaft sections. Packing ring 23 is sufficiently rigid to prevent separation of female member 13 from male member 15 during normal operation of the shafting.

Female member 13 is formed with an external peripheral groove 26 adapted to receive a V-belt for driving an additional unit off the coupling.

Any desired number of lugs 19 and 20 with appropriate angular spacing therebetween may be employed within the spirit of the invention.

While a specific embodiment of a torque-transmitting coupling for flexible shafting has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A coupling for connecting a pair of aligned shaft sections comprising a male member and a female member, said female member being formed with an axial bore receiving and permitting limited sidewise movement of said mail member relative to said female member, means for securing said members on the related shaft sections against relative movement thereon, a spider comprising an annulus positioned in said axial bore between the axially inward end of said male member and the adjacent end of said bore, said adjacent end of said bore and said axially inward end of said male member being formed with circumferentially spaced recesses, and opposite sides of said spider annulus having circumferentially spaced projections extending into corresponding ones of said recesses.

2. A coupling for connecting a pair of aligned shaft sections comprising a male member and a female member, said female member being formed with an axial bore receiving and permitting limited sidewise movement of said male member relative to said female member, means for securing said members on the related shaft sections against relative movement thereon, a spider comprising an annulus positioned in said axial bore between the axially inward end of said male member and the adjacent end of said bore, said adjacent end of said bore and said axially inward end of said male member being formed with circumferentially spaced recesses, and opposite sides of said spider annulus having circumferentially spaced projections extending into corresponding ones of said recesses, the spaces existing between the walls of said axial bore and the portion of said male member within said axial bore and the opening of said annulus defining a lubricant chamber, the exterior of said portion of said male-member and the sidewall of said axial bore being formed with registering grooves, and a flexible packing positioned in said grooves and closing said lubricant chamber.

3. A coupling for connecting two aligned shaft sections, said coupling comprising male and female members having tubular portions receiving corresponding ends of said shaft sections, means for locking the shaft section ends therein, said female member being formed with an axial bore opening through the axially inward end thereof and terminating at its axially outward end in an end wall, said male member having a cylindrical portion of substantial length loosely inserted in said bore for limited sidewise movement in said bore, the axially inward end of said cylindrical portion being axially spaced from said end wall of said bore in the female member, said axially inward end of said cylindrical portion and said bore end wall being formed with circumferentially spaced recesses, a spider comprising an annulus positioned in the space between said axially inward end of said cylindrical portion and said bore end wall and loosely fitting said bore, circumferentially spaced projections on opposite sides of said annulus projecting into corresponding ones of said recesses so as to connect said male and female members for rotation together.

4. A coupling for connecting two aligned shaft sections, said coupling comprising male and female members having tubular portions receiving corresponding ends of said shaft sections, means for locking the shaft section ends therein, said female member being formed with an axial bore opening through the axially inward end thereof and terminating at its axially outward end in an end wall, said male member having a cylindrical portion of substantial length loosely inserted in said bore for limited sidewise movement in said bore, the axially inward end of said cylindrical portion being axially spaced from said end wall of said bore in the female member, said axially inward end of said cylindrical portion of said bore and said bore end wall being formed with circumferentially spaced recesses, a spider comprising an annulus positioned in the space between said axially inward end of said cylindrical portion and said bore end wall and loosely fitting said bore, circumferentially spaced projections on opposite sides of said annulus projecting into corresponding ones of said recesses so as to connect said male and female members for rotation together, the opening of said spider annulus, the space between said bore end wall and the axially inward end of said cylindrical portion constituting a lubricant chamber, and a flexible lubricant seal bridging the space between said bore and the side of said cylindrical portion.

PAUL R. YATES.

REFERENCES CITED

The following references are of record in the file of this patent:

UNITED STATES PATENTS

| Number | Name | Date |
|---|---|---|
| 360,745 | Waugaman | Apr. 5, 1887 |
| 1,146,727 | Madden | July 13, 1915 |
| 1,575,927 | Morse | Mar. 9, 1926 |
| 1,651,671 | Carrey | Dec. 6, 1927 |
| 1,842,582 | Bulley | Jan. 26, 1932 |